US006931431B2

(12) United States Patent
Cachin et al.

(10) Patent No.: US 6,931,431 B2
(45) Date of Patent: Aug. 16, 2005

(54) AGREEMENT AND ATOMIC BROADCAST IN ASYNCHRONOUS NETWORKS

(75) Inventors: Christian Cachin, Thalwil (CH); Klaus Kursawe, Leuven (CH); Victor Shoup, Zurich (CH); Frank Petzold, Stuttgart (DE)

(73) Assignee: International Business Machines Corporation, Armonk, NY (US)

( * ) Notice: Subject to any disclaimer, the term of this patent is extended or adjusted under 35 U.S.C. 154(b) by 689 days.

(21) Appl. No.: 10/045,907

(22) Filed: Jan. 11, 2002

(65) Prior Publication Data

US 2002/0129087 A1 Sep. 12, 2002

(30) Foreign Application Priority Data

Jan. 13, 2001 (EP) ............................................. 01100790

(51) Int. Cl.[7] .............................................. G06F 15/16
(52) U.S. Cl. ...................... 709/205; 709/203; 709/204; 709/206
(58) Field of Search ................................ 709/205, 206, 709/204, 203

(56) References Cited

U.S. PATENT DOCUMENTS

| 4,531,185 A | * | 7/1985 | Halpern et al. | ............. | 713/375 |
| 4,569,015 A | * | 2/1986 | Dolev et al. | ................ | 709/201 |
| 4,644,542 A | * | 2/1987 | Aghili et al. | ................ | 714/701 |
| 5,390,302 A | * | 2/1995 | Johnson et al. | ............. | 709/230 |
| 5,598,529 A | * | 1/1997 | Garay et al. | ................... | 714/11 |
| 6,704,887 B2 | * | 3/2004 | Kwiat et al. | ................... | 714/10 |
| 6,754,845 B2 | * | 6/2004 | Kursawe et al. | ............... | 714/4 |
| 2001/0025351 A1 | * | 9/2001 | Kursawe et al. | ............... | 714/4 |
| 2001/0039630 A1 | * | 11/2001 | Kursawe et al. | ............... | 714/4 |
| 2004/0254967 A1 | * | 12/2004 | Cachin | ...................... | 708/250 |

OTHER PUBLICATIONS

Christian Cachin, Jonathan A. Poritz, "Secure Intrusion–tolerant Replication on the Internet", Jun. 2002, IEEE.*
Christian Cachin, Klaus Kursawe, Victor Shoup, "Random Oracles in Constantinople: Practical Asynchronous Byzantine Agreement Using Cryptography", Jul. 2000, ACM Digital Library.*
C. Mohan, R. Strong, S. Finkelstein, "Method for Distributed Transaction Commit and Recovery Using Byzantine Agreement Within Clusters of Processors", 1983, ACM.*

* cited by examiner

*Primary Examiner*—Rupal Dharia
*Assistant Examiner*—Tan Lien
(74) *Attorney, Agent, or Firm*—Louis P. Herzberg (57) ABSTRACT

Methods and apparatus for achieving agreement among participating network devices in an asynchronous network for deciding on a common value is disclosed, whereby the common value is validated by a justification and both together satisfy a predetermined predicate. Moreover, a method for reliably broadcasting messages in an order within the asynchronous network is described. Up to one third or more of the participating network devices might be faulty in arbitrary ways.

21 Claims, 4 Drawing Sheets

AGREEMENT AND ATOMIC BROADCAST IN ASYNCHRONOUS NETWORKS

TECHNICAL FIELD

The present invention relates to a network whose processor nodes exchange information by sending messages in an asynchronous fashion. More particularly, the invention relates to methods and apparatus for achieving agreement among processors, even in the presence of undetected faulty processors, and to a method for reliably broadcasting the messages in an order within an asynchronous point-to-point network. Thus, it is applicable in a wide range of distributed computation systems, reaching from fault-tolerant database systems to intrusion tolerant e-commerce servers.

BACKGROUND OF THE INVENTION

Distributed systems running in error-prone and adversarial environments have to rely on trusted components. In today's Internet these are typically directory and authorization services, such as the domain name system (DNS), Kerberos, certification authorities, or secure directories. Building such centralized trusted services has turned out to be a valuable design principle for computer security because the trust in them can be leveraged to many, diverse applications that all benefit from centralized management. Often, a trusted service is implemented as the only task of an isolated and physically protected machine.

Unfortunately, centralization introduces a single point of failure. Even worse, it is increasingly difficult to protect any single system against the sort of attacks proliferating on the Internet today. One established way for enhancing the fault tolerance of centralized components is to distribute them among a set of servers and to use replication algorithms for masking faulty servers or devices. Thus, no single server has to be trusted completely and the overall system derives its integrity from a majority of correct servers.

The use of cryptographic methods for maintaining consistent state in a distributed system has a long history and originates with the work of M. Pease, R. Shostak, and L. Lamport, in "Reaching agreement in the presence of faults," Journal of the ACM, vol. 27, pp. 228–234, April 1980.

The work of M. K. Reiter and K. P. Birman, "How to securely replicate services," ACM Transactions on Programming Languages and Systems, vol. 16, pp. 986–1009, May 1994 introduces secure state machine replication in a Byzantine environment and a broadcast protocol based on threshold cryptography that maintains causality among the requests.

Since no robust threshold-cryptographic schemes and secure atomic broadcast protocols were not known at that time, no fully robust systems for an asynchronous environment with malicious faults could be designed.

Subsequent work by Reiter in "Distributing trust with the Rampart toolkit," Communications of the ACM, vol. 39, pp. 71–74, April 1996 assumes a model which implements atomic broadcast on top of a group membership protocol that dynamically removes apparently faulty servers from the set.

M. Castro and B. Liskov in "Practical Byzantine fault tolerance," in Proc. Third Symp. Operating Systems Design and Implementation, 1999 present a practical algorithm for distributed service replication that is fast if no failures occur. It requires no explicit time-out values, but assumes that message transmission delays do not grow faster than some predetermined function for an indefinite duration. Since this protocol is deterministic, it can be blocked by a Byzantine adversary (i.e., violating liveness). In contrast, an approach based on a probabilistic agreement protocol satisfying both conditions would be a better approach.

The Total family of algorithms for total ordering by L. E. Moser and P. M. Melliar-Smith, "Byzantine-resistant total ordering algorithms," Information and Computation, vol. 150, pp. 75–111, 1999 implements atomic broadcast in a Byzantine environment, but only assuming a benign network scheduler with some specific probabilistic fairness guarantees. Although this may be realistic in highly connected environments with separate physical connections between all machines, it seems not appropriate for arbitrary Internet settings.

K. P. Kihlstrom, L. E. Moser, and P. M. Melliar-Smith, "The SecureRing protocols for securing group communication," in Proc. 31st Hawaii International Conference on System Sciences, pp. 317–326, IEEE, January 1998 and the work of A. Doudou, B. Garbinato, and R. Guerraoui, "Abstractions for devising Byzantine-resilient state machine replication," in Proc. 19th Symposium on Reliable Distributed Systems (SRDS 2000), pp. 144–152, 2000 are two examples of atomic broadcast protocols that rely on failure detectors in the Byzantine model. They encapsulate all time-dependent aspects and obvious misbehavior of a party in the abstract notion of a failure detector and permit clean, deterministic protocols. But failure detectors are not well understood in Byzantine environments.

U.S. Pat. No. 4,644,542 describes a method for reliably broadcasting information in a point-to-point network of processors in the presence of component faults provided that the network remains connected using only an exchange of messages. The method possesses the properties that every message broadcast by a fault-free processor is accepted exactly once by all fault-free processors within a bounded time, that every message broadcast is either accepted by all fault-free processors or none of them, and that all messages accepted by fault-free processors are accepted in the same order by all those processors. The method is based on a diffusion technique for broadcasting information and on special message validity tests for tolerating any number of component failures up to network partitioning or successful forgery.

U.S. Pat. No. 5,598,529 discloses a computer system resilient to a wide class of failures within a synchronized network. It includes a consensus protocol, a broadcast protocol and a fault tolerant computer system created by using the two protocols together in combination. The protocols are subject to certain validity conditions. The system in the state of consensus is guaranteed to have all non-faulty processors in agreement as to what action the system should take. The system and protocols can tolerate up to t processor failures out of 3t+1 or more processors, but requires as well as the before mentioned method timing guarantees and is therefore not suitable for asynchronous networks.

Fault-tolerant systems use computer programs called protocols to ensure that the systems will operate properly even if there are individual processor failures.

A fault-tolerant consensus protocol enables each processor or party to propose an action (via a signal) that is required to be coordinated with all other processors in the system. A fault-tolerant consensus protocol has as its purpose the reaching of a "consensus" on a common action (e.g., turning a switch off or on) to be taken by all non-faulty processors and ultimately the system. Consensus protocols are necessary because processors may send signals to only a single other processor at a time and a processor failure can cause two processors to disagree on the signal sent by a third failed processor. In spite of these difficulties, a fault-tolerant consensus protocol ensures that all non-faulty processors agree on a common action.

To reach consensus, consensus protocols first enable each processor or participating network device to propose an action (via a signal) that is later to be coordinated by all the processors or participating network devices in the system. The system then goes through the steps of the consensus protocol. After completing the consensus protocol steps, the common action of the consensus is determined.

A safe architecture for distributing trusted services among a set of servers is desired that guarantees availability and integrity of the services despite some servers being under control of an attacker or failing in arbitrary malicious ways. The architecture should be characterized by a static set of servers and completely asynchronous point-to-point communication. Trusted applications can only be achieved by an efficient and provably secure agreement and broadcast protocol.

SUMMARY OF THE INVENTION

One aspect of the invention provides a machine-implementable method for achieving multi-valued Byzantine agreement among n participating network devices, also called processors or parties. The method achieves agreement and consensus among the n participating network devices in an asynchronous network for deciding on a common value v. The common value v is validated by a justification p, whereby the common value v and the justification p together satisfy a predetermined predicate Q. The agreement arises out of a series of messages being sent and received by each participating network device with up to a number t of faulty devices. The method turns out to be practical and also theoretically nearly optimal in the sense that it withstands the maximum number of corrupted devices t<n/3 and uses a nearly optimal number of messages whereby the total bit-length of these messages is also nearly optimal.

Another aspect of the invention provides a method for reliably broadcasting messages in an order within the asynchronous network comprising n participating network devices. This ordered broadcast protocol, also referred to as atomic broadcast protocol, tolerates a number t of less than n/3 faulty participating network devices. Client requests to a service are delivered by the atomic broadcast protocol that imposes a total order on all requests and guarantees that the participating network devices perform the same sequence of operations. The atomic broadcast can be realized by use of a randomized protocol to solve Byzantine agreement, such as the multi-valued Byzantine agreement as mentioned above.

In another aspect of the invention a secure architecture for distributing trusted services among a set of participating network device is provided by use of the multi-valued Byzantine agreement and the atomic broadcast protocol that guarantees availability and integrity (or equivalently, liveness and safety) of the services despite some participating network devices being under control of an attacker or failing in arbitrary malicious ways. The architecture is characterized by a static set of participating network device, completely asynchronous point-to-point communication, and the use of modem cryptographic techniques. Trusted applications can be realized by deterministic state machines replicated on all servers or participating network devices and initialized to the same state.

In the asynchronous model there are no timing assumptions in the design of any protocol. Asynchronous protocols are attractive because in a synchronous system, the designer has to specify time-out values, which is very difficult when protecting against arbitrary failures that may be caused by a malicious attacker. It is usually much easier for an intruder to block communication with a server than to subvert it. Prudent security engineering also gives the adversary full access to all specifications, including time-outs, and excludes only cryptographic keys. Such an adversary may simply delay the communication to a server for a little longer than the time-out and the server appears faulty to the remaining system. Therefore the presented asynchronous protocols are designed to resist all timing attacks.

The basic idea of the multi-valued Byzantine agreement is that every participating network device proposes its value as a candidate value for the final result. One participating network device whose proposal satisfies the validation predicate Q is then selected in a sequence of binary Byzantine agreement protocols and this value becomes the final decision value.

In general, the method for achieving multi-valued Byzantine agreement among n participating network devices comprises: i) echoing a proposal, ii) an agreement loop, and iii) delivering the chosen proposal. More precisely, the multi-valued Byzantine agreement comprises the detailed steps: i) broadcasting to the participating network devices an echo message comprising a proposed value w and a proposed justification $\pi$ by using verifiable and consistent broadcast; ii) receiving n-I echo messages comprising candidate values $w_i$ and candidate justifications $\pi_i$ satisfying the predicate Q, and repeating the following steps 1) to 3) for each participating network device as a candidate device represented by a candidate device identifier a according to an order: 1) broadcasting to all participating network devices a vote message comprising the candidate device identifier a, and either a first agree-value Y together with the candidate value $W_a$ and the candidate justification $\pi_a$, or a second agree-value N, 2) receiving vote messages and counting up to n-t vote messages including the second agree-value N or the first agree-value Y, the candidate value $w_a$, and the candidate justifications $\pi_a$ satisfying the predicate Q, and 3) performing a Byzantine agreement to determine whether the candidate device has sent the candidate value $W_a$ and the candidate justification $\pi_a$ satisfying the predicate Q, iii) in response to the result of the Byzantine agreement, deciding the common value v proposed as the candidate value w and the justification p proposed as the candidate justification $\pi$ of an agreed candidate device.

The multi-valued Byzantine agreement protocol may further comprise in step ii) broadcasting a commit message comprising sender identities of received echo messages, receiving commit messages, and selecting randomly the order in which the candidate device is considered by opening at least one cryptographic common coin. By doing so, the counted vote messages in step 2) can be restricted to those that are consistent with the received commit messages. This has the advantage that the protocol runs in a constant expected number of rounds and therefore terminates faster. In particular, the agreement loop is executed a number of times which is independent of the number of participating network devices.

The step of opening at least one cryptographic common coin may comprise using a distributed coin-tossing protocol, which has the advantage that a distributed protocol can be used and no centralized authority is required.

The verifiable and consistent broadcast in step i) may comprise a certified delivery of the broadcasted echo message within a sent message and whereby the agreement is reached on the content of the broadcasted echo message. This shows the advantage that certified delivery occurs within a single message.

Furthermore, the verifiable and consistent broadcast in step i) may comprise an exchange of signed messages between the participating network devices.

The verifiable and consistent broadcast in step i) may comprise the use of threshold signatures. By using them, the size of the used messages can be reduced. A suitable threshold signature scheme has been provided by Y. Shoup and published in the article "Practical threshold signatures", in Advances in Cryptology: EUROCRYPT 2000 (B. Preneel, ed.), vol. 1087 of Lecture Notes in Computer Science, pp. 207–220, Springer, 2000. This article is incorporated herein by means of reference.

The multi-valued Byzantine agreement protocol may further comprise in steps 1) and 2) in step ii) broadcasting the candidate value $w_a$ and the candidate justification $\pi_a$ only upon a request. This proofs advantageously, because it reduces the number and the size of the messages.

The multi-valued Byzantine agreement protocol may further comprise in step ii) that the participating network devices are voting on several candidate devices simultaneously. This shows the advantage that if the number n of participating network devices is small then the number of rounds can be kept small as well.

Within the atomic broadcast protocol each participating network device stores a queue q and a log file, hereafter short log d. The atomic broadcast protocol operates in rounds, whereby each round comprises the following steps: i) responsive to a message broadcast request comprising a message value m performing the step of: appending the message value m to the queue q unless the log d or the queue q comprises the message value m, ii) deriving a signature $\sigma$ on the queue q, iii) broadcasting to all participating network devices a queue message comprising the queue q and the signature $\sigma$, iv) receiving a number c of at least t+1 queue messages comprising c proposed queues $q_i$ and proposed signatures $\sigma_i$, v) storing the proposed queues $q_i$ in a queue vector QV and the proposed signatures $\sigma_i$ in a signature vector SV, vi) proposing the queue vector QV for Byzantine agreement validated by the signature vector SV and performing a method for achieving agreement on a common value being validated by a justification p together satisfying a predetermined predicate Q by validating the queue vector QV and the signature vector SV through a determined predicate Q asserting that the signature vector SV comprises c valid signature entries of distinct participating network devices on entries of the queue vector QV, vii) preparing in response to the result of the Byzantine agreement an ordered list L of unique message values out of the entries of the decided queue vector DQV, viii) accepting the unique message values in the ordered list L in the sequence of the ordered list L, ix) appending the accepted unique message values to the log d.

The atomic broadcast protocol may further comprises in step iv) appending an unknown message value found in a received queue message to the queue q unless the log d or the queue q comprises the unknown message value. This has the advantage that the unknown message is delivered faster by the system.

Glossary

The following are helpful definitions to aid in the understanding of the description.

Validated Byzantine Agreement: A protocol solves validated Byzantine agreement with predicate Q if it satisfies the following conditions except with negligible probability:

External Validity: Any honest participating network device that terminates decides on a common value v validated by a justification $\pi$ such that Q (v, $\pi$) holds.

Agreement: If some honest participating network device decides on the common value v, then any honest participating network device that terminates decides on the common value v.

Termination: Each honest participating network device eventually terminates the validated Byzantine agreement protocol.

Thus, honest participating network devices may propose all different values and the decision value may have been proposed by a corrupted participating network device, as long as honest participating network devices obtain the corresponding validation during the protocol. The agreement and termination are the same as in the definition of ordinary, binary Byzantine agreement. Another variation of the validity condition is that an application may prefer one decision value over others. Such an agreement protocol may be biased and always output the preferred value in cases where other values would have been valid as well. For binary validated agreement, the method of the invention will apply a protocol that is biased towards 1 or Yes. Its purpose is to detect whether there is a validation for 1, so it suffices to guarantee termination with output 1 if t+1 honest participating network devices know the corresponding information at the outset. A binary validated Byzantine agreement protocol biased towards 1 is a protocol for validated Byzantine agreement on values in $\{0, 1\}$ such that the following condition holds:

Biased Validity: If at least t+1 honest participating network devices propose 1 validated by $\pi$ such that Q (1, $\pi$) holds, then any honest participating network device that terminates decides 1.

Reliable Broadcast: In a reliable broadcast each message is delivered with an indication of its sender. A reliable broadcast protocol satisfies the following properties:

Validity: If an honest participating network device broadcasts a message m, then all honest participating network devices eventually deliver m.

Agreement: If some honest participating network device has delivered m, then eventually all honest participating network devices deliver m.

Integrity: Each honest participating network device delivers m at most once, and if the indicated sending participating network device is honest, then m was previously sent by the indicated participating network device.

Verifiable Broadcast: A reliable broadcast protocol is called verifiable if the following holds, except with negligible probability: When an honest participating network device has delivered a message m, then it can produce a single protocol message M that it may send to other participating network devices such that any other honest participating network device will deliver m upon receiving M (provided the other participating network device has not already delivered m).

M is the message that completes the verifiable broadcast. This notion implies that there is a predicate that the receiving participating network device can apply to an arbitrary bit string for checking if it constitutes a message that completes a verifiable broadcast.

Consistent Broadcast: A protocol for consistent broadcast satisfies all properties of a reliable broadcast, except that the agreement property is replaced by the following:

Consistency: If some honest participating network device delivers m and another honest participating network device delivers m', then m=m'.

Thus, consistent broadcast makes no provisions that two participating network devices deliver the message, but maintains agreement among the actually delivered messages with the same senders and sequence numbers.

Atomic Broadcast: Atomic broadcast is an ordered reliable broadcast. A protocol for atomic broadcast is a protocol for reliable broadcast that also satisfies the following property:

Total Order: If a first honest participating network device delivers m and m', and a second honest participating network device delivers m and m', then the first honest participating network device delivers m before m' if and only if the second honest participating network device delivers m before m'.

It is known that protocols for atomic broadcast are considerably more expensive than those for reliable broadcast. This is because even with crash faults, atomic broadcast is equivalent to consensus and cannot be solved by deterministic protocols in an asynchronous network.

Digital Signature: The invention uses unforgeable, transferable digital signatures to allow parties or participating network devices to justify their messages, which limits the possibilities of an adversary.

Threshold cryptography: Threshold cryptographic schemes are non-trivial extensions of the classical concept of secret sharing in cryptography. Secret sharing allows a group of n participating network devices or parties to share a secret such that t or fewer of them have no information about it, but t+1 or more can uniquely reconstruct it. However, one cannot simply share the secret key of a cryptosystem and reconstruct it for decrypting a message because as soon as a single corrupted party knows the key, the cryptosystem becomes completely insecure and unusable.

Threshold Signature: In a threshold signature scheme, each participating network device holds a share of the secret signing key and may generate shares of signatures on individual messages upon request. The validity of a signature share can be verified for each participating network device. From t+1 valid signature shares, one can generate a digital signature on the message that can later be verified using the single, publicly known signature verification key. In a secure threshold signature scheme, it is infeasible for a computationally bounded adversary to produce t+1 valid signature shares that cannot be combined to a valid signature (robustness), and to output a valid signature on a message for which no honest participating network device generated a signature share (no forgery).

Threshold Coin-Tossing: A threshold coin-tossing protocol provides arbitrarily many unpredictable random bits. An efficient implementation of a threshold coin-tossing scheme is part of the randomized Byzantine agreement protocol of C. Cachin, K. Kursawe, and V. Shoup, "Random oracles in Constantinople: Practical asynchronous Byzantine agreement using cryptography," in Proc. 19th ACM Symposium on Principles of Distributed Computing (PODC), pp. 123–132, 2000. It can be used to ensure termination of the agreement protocol within an expected constant number of rounds.

Hybrid Failures

The method for achieving agreement among n participating network devices in an asynchronous network for deciding on a common value v and the method for reliably broadcasting messages in an order can distinguish between several different ways in which a network device can fail. This could for example be Byzantine Failures BF: If a byzantine failure BF occurs, the adversary has taken full control over the corresponding machine. All secrets this machine has are handed over to the adversary, who now controls its entire behavior.

Crash Failures CF: A crash failure CF simply means that the corresponding machine stops working. This could happen anytime, i.e., even in the middle of a broadcast or while sending a message. It is assumed that there is no mechanism other parties can reliably detect such a crash.

Link Failures LF: A link failure LF occurs when not a party, but an interconnecting link becomes faulty. As the link has no access to authentication keys, it is easy to prevent it from modifying or inserting messages. A faulty link could however delete messages, and it might completely disconnect two parties.

Adversary Structure

An adversary structure T is a set of sets (coalitions) of parties whose corruption the system should be tolerated. Let M be the set of all participating network devices. An adversary structure is called $Q^2$, if no two coalitions $N_1$, $N_2 \in T$ satisfy $N_1 \cup N_2 = M$.

$Q^3$, if no three coalitions $N_1$, $N_2$, $N_3 \in T$ satisfy $N_1 \cup N_2 \cup N_3 = M$.

$Q^{2+3}$ with respect to CF and BF, if for all $c_1, c_2 \in CF$ and all $b_1, b_2, b_3 \in BF$, $M \backslash \{b_1 \cup b_2 \cup b_3 \cup c_1 \cup c_2\} \not= \emptyset$;

A $Q^2$ adversary structure is sufficient to solve byzantine agreement if only crash failures CF occur. $Q^3$ is applied in the byzantine case, where only byzantine failures BF occur, while $Q^{2+3}$ is the generalization for the hybrid crash-byzantine failure case.

DESCRIPTION OF THE DRAWINGS

The invention is described in detail below with reference to the following schematic drawings.

DETAILED DESCRIPTION OF THE INVENTION

The present invention relates to a network whose processor nodes exchange information by sending messages in an asynchronous fashion. More particularly, the invention relates to a methods and apparatus for achieving agreement among the processors, even in the presence of undetected faulty processors, and to a method for reliably broadcasting the messages in an order within an asynchronous point-to-point network.

With general reference to the figures, the essential features of a method for achieving agreement among n participating network devices in an asynchronous network for deciding on a common value v and a method for reliably broadcasting messages in an order are described in more detail below.

At first, some basics, in accordance with the present invention, are addressed.

Validated Byzantine Agreement

The standard notion of Byzantine agreement implements a binary decision and can guarantee a particular outcome only if all honest participating network devices propose the same value. A weaker validity condition is herewith introduced, called external validity, which relaxes the validity condition and generalizes to decisions on a common value v from an arbitrarily large set. It requires that the decided value v satisfies a global predicate Q that is determined by the particular application and known to all participating network devices. Each participating network device adds some validation data to the proposed value, which serves as the proof for its validity. Typically, this comprises a digital signature that can be verified by all participating network devices. The agreement protocol then returns to a caller not only the decision value, but also the corresponding validation data. The caller might need this information if it did not know it before.

The validated Byzantine agreement generalizes the primitive of agreement on a core set and the notion of interactive consistency, as described by M. J. Fischer, "The consensus problem in unreliable distributed systems (a brief survey)," in Foundations of Computation Theory (M. Karpinsky, ed.), vol. 158 of Lecture Notes in Computer Science, Springer, 1983, to the Byzantine model, which uses agreement on a vector of n values, one from each participating network device.

Verifiable Broadcast

One participating network device that has delivered a payload message using reliable broadcast may want to inform another respective participating network device about this. Such information might be useful to the respective participating network device if it has not yet delivered the message, but can exploit this knowledge somehow, in particular since the respective participating network device is guaranteed to deliver the same message by the agreement property in reliable broadcast. In a standard reliable broadcast, however, this knowledge cannot be transferred in a verifiable way. Therefore, this property of a broadcast protocol is identified here because it is useful in the application, and called verifiability. Informally, it means this: when the respective participating network device claims that it is not yet in a state to deliver a particular payload message m, then the one participating network device can reply with a single protocol message and when the respective participating network device processes this, it will deliver m immediately and terminate the corresponding broadcast.

Reliable Broadcast

Protocols for reliable broadcast in an asynchronous network with Byzantine faults are well known in the art, where the reliable broadcast is also known as the problem of the Byzantine generals, as described in the article by L. Lamport, R. Shostak, and M. Pease, "The Byzantine generals problem," ACM Transactions on Programming Languages and Systems, vol. 4, pp. 382–401, July 1982. An applicable protocol has been described by G. Bracha in the article "An asynchronous $$\left\lfloor \frac{n-1}{3} \right\rfloor.$$

consensus protocol," in Proc. 3rd ACM Symposium on Principles of Distributed Computing (PODC), pp. 154–162, 1984.

Consistent Broadcast

Several protocols for consistent broadcast have been proposed by M. Reiter, "Secure agreement protocols: Reliable and atomic group multicast in Rampart," in Proc. 2nd ACM Conference on Computer and Communications Security, 1994. The agreement property of reliable broadcast is rather expensive to satisfy; it is the main reason why most protocols for reliable broadcast need on the order of $n^2$ messages. For some applications, however, agreement is not necessary and can be ensured by other means, as long as integrity is satisfied. The resulting notion is called consistent broadcast.

Cryptography

Cryptographic techniques such as public-key encryption schemes and digital signatures are useful for many existing secure services. For distributing trusted services, distributed variants of them from threshold cryptography can be applied.

Threshold-cryptographic protocols have been used for secure service replication before, e.g., as described by M. K. Reiter and K. P. Birman, "How to securely replicate services," ACM Transactions on Programming Languages and Systems, vol. 16, pp. 986–1009, May 1994. However, a major complication for adopting threshold cryptography to an asynchronous distributed system is that many early protocols are not robust and that most protocols rely heavily on synchronous broadcast channels. Only very recently, non-interactive schemes have been developed that satisfy the appropriate notions of security, such as the threshold cryptosystem of V. Shoup and R. Gennaro, "Securing threshold cryptosystems against chosen ciphertext attack," in Advances in Cryptology: EUROCRYPT '98 (K. Nyberg, ed.), vol. 1403 of Lecture Notes in Computer Science, Springer, 1998 and the threshold signature scheme of V. Shoup, "Practical threshold signatures," in Advances in Cryptology: EUROCRYPT 2000 (B. Preneel, ed.), vol. 1087 of Lecture Notes in Computer Science, pp. 207–220, Springer, 2000.

Non-Interactive Threshold Signatures

A useful tool for the atomic broadcast protocol are non-interactive threshold signatures. More precisely, a dual-threshold variations can be applied as introduced by C. Cachin, K. Kursawe, and V. Shoup, in "Random oracles in Constantinople: Practical asynchronous Byzantine agreement using cryptography," in Proc. 19th ACM Symposium on Principles of Distributed Computing (PODC), pp. 123–132, 2000. The basic idea of a dual-threshold signature scheme is that there are n participating network devices, t of which may be corrupted. The participating network devices hold shares of the secret key of a signature scheme and may generate shares of signatures on individual messages. The condition is that $\kappa$ signature shares are necessary and sufficient to construct a signature, where $t < \kappa \leq n-t$.

More precisely, a non-interactive (n, $\kappa$, t)-dual-threshold signature scheme comprises the following parts:

A key generation algorithm with input parameters k, n, $\kappa$ and t. It outputs the public key of the scheme, a private key share for each participating network device, and a local verification key for each participating network device.

A signing algorithm with inputs a message, the public key and a private key share. It outputs a signature share on the submitted message.

A share verification algorithm with inputs a message, a signature share on that message from a participating network device, along with the global public key and the local verification key of the respective participating network device. It determines if the signature share is valid.

A share combining algorithm that takes as input a message and $\kappa$ valid signature shares on the message, along with the public key and the verification keys, and outputs a valid signature on the message.

A signature verification algorithm that takes as input a message and a signature (generated by the share-combining algorithm), along with the public key, and determines if the signature is valid.

During initialization, a dealer runs the key generation algorithm and gives each participating network device the public key, all local verification keys, and its private key share. The adversary may submit signing requests to the honest participating network devices for messages of its choice. Upon receiving such a request, a participating network device computes a signature share for the given message using its private key share. Given $\kappa$ valid signature shares from distinct participating network devices on the same message, they may be combined into a signature on the message.

The two basic security requirements are robustness and non-forgeability. Robustness means that it is computationally infeasible for an adversary to produce $\kappa$ valid signature shares such that the output of the share combining algorithm is not a valid signature. Non-forgeability means that it is computationally infeasible for the adversary to output a valid signature on a message that was submitted as a signing request to less than $\kappa-t$ honest participating network devices.

A practical scheme that satisfies these definitions in the random oracle model was proposed by V. Shoup, in "Practical threshold signatures," in Advances in Cryptology: EUROCRYPT 2000 (B. Preneel, ed.), vol. 1087 of Lecture Notes in Computer Science, pp. 207–220, Springer, 2000.
Threshold Coin-Tossing A distributed (n, t+1)-threshold coin-tossing scheme can be applied. The basic idea is the same as for the other threshold primitives, but here the participating network devices hold shares of a pseudorandom function F. It maps a bit string N, the name of a coin, to its value $F(N) \in \{0,1\}^{k''}$, whereby a generalized coin is used that produces k" random bits simultaneously. The participating network devices may generate shares of a coin and t+1 shares of the same coin are both necessary and sufficient to construct the value of that coin. The generation and verification of coin shares are non-interactive.

During initialization the dealer generates a global verification key, a local verification key for each participating network device, and a secret key share for each participating network device. The initial state information for each participating network device comprises its secret key share and all verification keys. The secret keys implicitly define the function F mapping names to k"-bit strings.

After the initialization phase, the adversary submits reveal requests to the honest parties for coins of his choice. Upon receiving such a request, a participating network device outputs a coin share for the given coin computed from its secret key.

The coin-tossing scheme also specifies two algorithms:

A share verification algorithm takes as input the name of a coin, a share of this coin from a participating network device, along with the global verification key and the verification key of the respective participating network device, and determines if the coin share is valid.

A share combining algorithm takes as input a name N of a coin and t+1 valid shares of N, along with the verification keys, and outputs F(N).

Verifiable and Consistent Broadcast

A protocol that implements verifiable and consistent broadcast uses a non-interactive $$\left(n, \left\lceil \frac{n+t+1}{2} \right\rceil, t\right)$$- signature scheme with verifiable shares according to the section above: Non-Interactive Threshold Signatures. All messages are authenticated.

The protocol is based on the "echo broadcast" of M. Reiter, "Secure agreement protocols: Reliable and atomic group multicast in Rampart," in Proc. 2nd ACM Conference on Computer and Communications Security, 1994, but uses a threshold signature to decrease the bit complexity. The idea behind it is that the sender broadcasts the message to all participating network devices and hopes for $$\left\lceil \frac{n+t+1}{2} \right\rceil$$

participating network devices to sign it as "witnesses" to guarantee integrity. The signature shares are then collected by the sender, combined to a signature on the message, and relayed to all participating network devices. After receiving the message together with a valid signature, one participating network device delivers it immediately. Because one participating network device may forward the message and the signature to other participating network devices, the protocol is verifiable.

Protocol for Binary Byzantine Agreement

Binary asynchronous Byzantine agreement protocols can be adapted to external validity. For example, in the protocol of C. Cachin, K. Kursawe, and V. Shoup, "Random oracles in Constantinople: Practical asynchronous Byzantine agreement using cryptography," in Proc. 19th ACM Symposium on Principles of Distributed Computing (PODC), pp. 123–132, 2000 one has to "justify" the pre-votes of round 1 with a valid $\pi$. The logic of the protocol guarantees that either a decision is reached immediately or the validations for 0 and for 1 are seen by all participating network devices in the first two rounds. Furthermore, the protocol can be biased towards 1 by modifying the coin such that it always outputs 1 in the first round.

Figure 1:
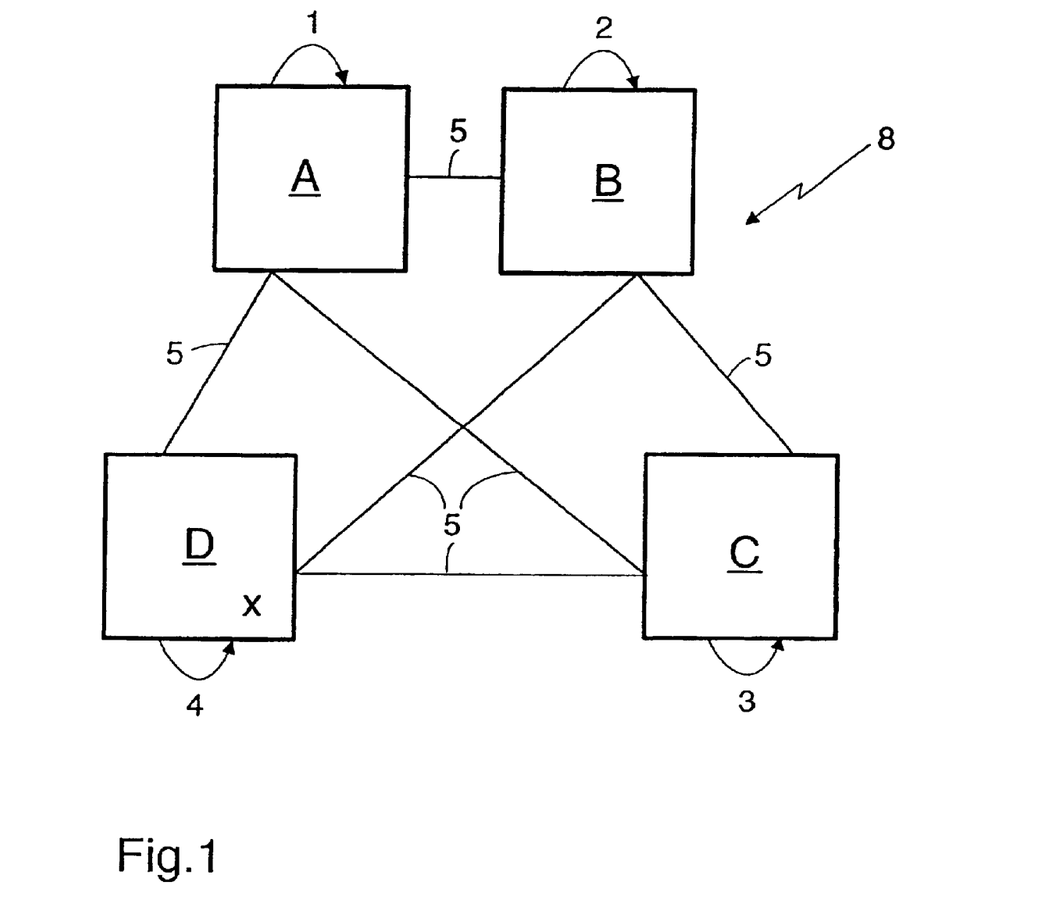
FIG. 1 shows a typical asynchronous network with multiple participating network devices.

Turning now to FIG. 1 which shows an example of a common computer system 8. It consists of four participating network devices A, B, C, D, which are connected via communication lines (1 through 4 and 5) to a network. The system, where the multi-valued Byzantine Agreement can be achieved, has one faulty device, which is designated by the "X" in participating network device D. Each participating network device A, B, C, D may be any type of computer device known in the art from a computer on a chip or a wearable computer to a large computer system. The communication lines can be any communication means commonly known to transmit data or messages from one participating network device A, B, C, D to another. For instance, the communication lines may be either single, bi-directional communication lines 5 between each pair of participating network devices A, B, C, D or one unidirectional line in each direction between each pair of participating network devices A, B, C, D. Such a computer system 8 and communication lines 5 are well known in the art. In the case where a participating network device A, B, C, D sends information to itself, an equivalent result could be achieved by merely moving data within the participating network device and not sending it over a communication line to itself. The common computer system 8 is shown to facilitate the description of the following multi-valued Byzantine Agreement protocol.

The following steps indicate a general method for achieving multi-valued Byzantine agreement in the validated form, whereby a series of messages being sent and received by each participating network device A, B, C, D. Every participating network device proposes its value as a candidate value w for the final result. One participating network device whose proposal satisfies the validation predicate Q is then selected in a sequence of binary Byzantine agreement protocols and this value becomes the final decision value v.

In general, the method for achieving multi-valued Byzantine Agreement among n participating network devices A, B, C, D comprises the following general steps:

i) Echoing a proposal: Each participating network device A, B, C, D sends a proposed value w that it proposes to all other participating network device A, B, C, D using verifiable and consistent broadcast. This ensures that all honest participating network devices A, B, C obtain the same proposal value w for any particular participating network device, even if the sender is corrupted. Then, each participating network device A, B, C, D waits until it has received n−t proposals satisfying the predicate Q before entering the following agreement loop.

ii) Agreement loop: One participating network device A, B, C, D is chosen after another, according to a fixed permutation II of $\{1, \ldots, n\}$. Let "a" denote the index of the participating network device A, B, C, D selected in the current round, also referred to as candidate device identifier. For each participating network device A, B, C, D the following steps are executed:

1) broadcasting to all participating network devices A, B, C, D a vote message comprising the candidate device identifier a, and either a first agree-value Y together with the candidate value $w_a$ and the candidate justification $\pi_a$, or a second agree-value N, 2) receiving vote messages and counting up to n−t vote messages including the second agree-value N or the first agree-value Y, the candidate value $w_a$, and the candidate justifications $\pi_a$ satisfying the predicate Q, and 3) performing a validated binary Byzantine agreement biased to 1 or Yes to determine whether the candidate device has sent the candidate value $w_a$ and the candidate justification $\pi_a$ satisfying the predicate Q, i.e. voting 1 or Yes if the participating network device A, B, C, D has received a valid proposal from the candidate device and validating this by the protocol message that completes the verifiable broadcast of the candidate device's proposal, otherwise voting 0 or No if the candidate device has received n−t vote messages comprising 0 or No, and if the validated binary Byzantine agreement decides 1 or Yes, exit from the Agreement loop and define the current candidate device as an agreed candidate device.

iii) Delivering the chosen proposal: In response to the result of the Byzantine agreement, the common value v is decided which was proposed as the candidate value w and the justification p that was proposed as the candidate justification π of said agreed candidate device.

In general, a message from one participating network device, e.g., participating network device A to another participating network device, e.g., participating network device B, has the form ID, A, B, payload whereby ID indicates a unique transaction-identifier. Every instance of a protocol is associated with such a transaction-identifier. A indicates the sender and B the receiver of the message sent in the network, as depicted in FIG. 1.

Figure 2:
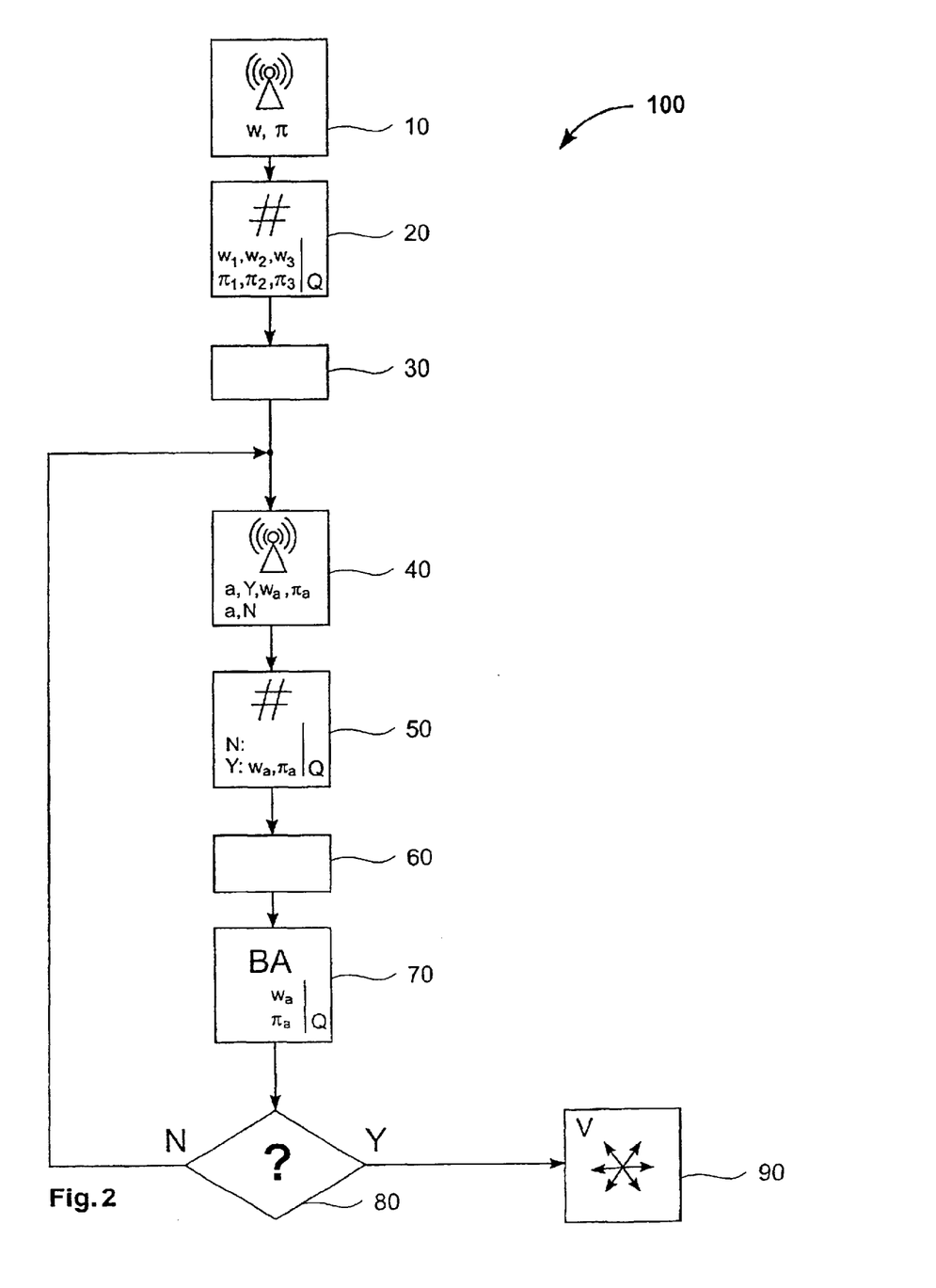
FIG. 2 shows an example of a schematic diagram of an agreement protocol according to the present invention.

FIG. 2 shows the flow of a multi-valued Byzantine Agreement protocol 100 for an implementation. Each participating network device A, B, C, D performs the steps as indicated by the boxes 10 to 90.

At first, as indicated with box 10, the participating network devices A, B, C, D broadcasts an echo message comprising a proposed value w and a proposed justification π by using verifiable and consistent broadcast. Then, each participating network device A, B, C, D receives n−t echo messages comprising candidate values $w_1$, $w_2$, $w_3$ and candidate justifications $\pi_1$, $\pi_2$, $\pi_3$ satisfying the predicate Q as indicated with box 20. The steps in box 30 are an extension of the current agreement and are described with reference to FIG. 3a below. The agreement loop starts with box 40, whereby for each participating network device A, B, C, D as a candidate device that is represented by a candidate device identifier a performs the following steps within an order.

A vote message comprising the candidate device identifier a, and either a first agree-value Y together with the candidate value $w_a$ and the candidate justification $\pi_a$, or a second agree-value N is broadcast to all participating network devices A, B, C, D, as indicated with box 40. This vote messages are then received and up to n−t vote messages are counted, as indicated with box 50. The vote messages include either the second agree-value N or the first agree-value Y, the candidate value $w_a$, and the candidate justifications $\pi_a$. The candidate value $w_a$ and the candidate justifications $\pi_a$ have to satisfy the predicate Q, otherwise they are not valid. The step in box 60 is an extension of the current agreement and relates to box 30 which are described with reference to FIGS. 3a and 3b below. As indicated in box 70, it follows a binary Byzantine agreement (BA). This Byzantine agreement is validated and biased to 1 or Yes. It is used to determine whether the candidate device has sent the candidate value $w_a$ and the candidate justification $\pi_a$ satisfying the predicate Q. It outputs a binary decision Y or N, which stands for Yes or No, as indicated with box 80. If the decision outputs N, the protocol carries on at box 40. If the decision outputs Y, a decision on the common value v is performed, as indicated by box 90. Thereby the common value v was proposed as the candidate value w and the justification p was proposed as the candidate justification π of an agreed candidate device.

A further example embodiment relates to a constant-round protocol for multi-valued Byzantine Agreement that guarantees termination within a constant expected number of rounds. In the multi-valued Byzantine Agreement above, an adversary might know the order in which the participating network devices A, B, C, D search for an acceptable candidate device, i.e., one that has broadcast a valid proposal. Although at least one third of all participating network devices A, B, C, D are guaranteed to be accepted, the adversary can choose the corruptions and schedule messages such that none of them is examined early in the agreement loop.

The remedy for this problem is to choose II randomly during the protocol after making sure that enough participating network devices A, B, C, D already committed to their votes on the candidate devices. This can be achieved in two steps. First, one round of commitment exchanges is added before the agreement loop, as indicated with box 30 in FIG. 2 already. Each participating network device A, B, C, D has to commit to the votes that it will cast by broadcasting the identities of the n−t participating network devices A, B, C, D from which it has received valid echo messages. Thereby, at least consistent broadcast should be used. Honest participating network devices A, B, C will later only accept vote messages that are consistent with the commitments made before. The second step is to determine the permutation Π using a threshold coin-tossing scheme that outputs a random, unpredictable value after enough votes are committed. Taken together, these steps ensure that the fraction of participating network device A, B, C, D which are guaranteed to be accepted are distributed randomly in Π, causing termination in a constant expected number of rounds.

Figure 3A:
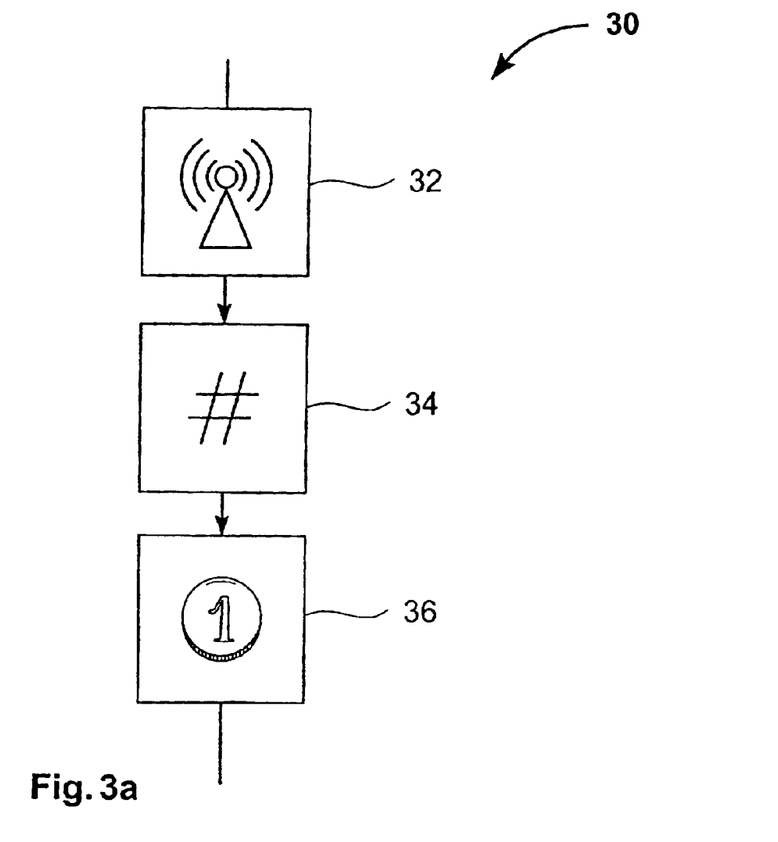
FIG. 3a shows an extension of the embodiment of the agreement protocol of FIG. 2.
Figure 3B:
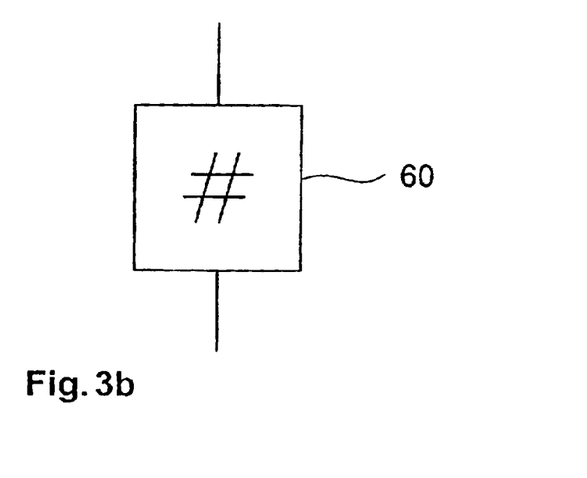
FIG. 3b shows a further extension of the embodiment of the agreement protocol of FIG. 2.

More precisely, the multi-valued Byzantine Agreement can be modified at the boxes 30 and 60 in FIG. 1, whereby the boxes 30 and 60 are described with reference to FIG. 3a and 3b in the following. As indicated with box 32, a commit message comprising sender identities of received echo messages is broadcast. The commit messages are received, as indicated with box 34. At least one cryptographic common coin is opened for selecting randomly the order of the candidate device, as indicated with box 36. The opening of the cryptographic common coin may comprise the use of a distributed coin-tossing protocol as described above. As indicated with box 60 in FIG. 3b, the vote messages are counted which are consistent with the received commit messages.

Atomic Broadcast

Atomic broadcast guarantees a total order on messages such that honest participating network devices A, B, C deliver all messages with a common tag in the same order. The atomic broadcast protocol described in this invention builds directly on the multi-valued Byzantine agreement.

The atomic broadcast protocol is efficient so that a payload message m is scheduled and delivered within a fixed number of steps after it is broadcast by the honest participating network device A, B, C. But since the adversary may delay the sender arbitrarily and deliver an a priori unbounded number of messages among the remaining honest participating network devices A, B, C, the protocol can only provide such a guarantee when t+1 honest participating network devices A, B, C become "aware" of m. Here the definition of fairness requires that after t+1 honest participating network devices A, B, C have broadcast some payload, it is guaranteed to be delivered within a fixed number of steps. It can be interpreted as a termination condition for the broadcast of a particular payload m. A client application might be able to satisfy this precondition through external means and achieve guaranteed fair delivery in this way.

Protocol for Atomic Broadcast

An example protocol for atomic broadcast based on validated Byzantine agreement is described in the following. Its overall structure is similar to the protocol of V. Hadzilacos and S. Toueg, "Fault-tolerant broadcasts and related problems," in Distributed Systems (S. J. Mullender, ed.), New York: ACM Press & Addison-Wesley, 1993 (an expanded version appears as Technical Report TR94–1425, Department of Computer Science, Cornell University, Ithaca N.Y., 1994) for the crash-fault model, but additional measures to tolerate Byzantine faults are used. The atomic broadcast protocol proceeds as follows. Each participating network device A, B, C, D maintains an implicit queue of not yet delivered payload messages. The received messages are placed in this queue whenever they are received. The protocol proceeds in asynchronous global rounds, where each round comprises the following general steps:

Send the current queue q to all participating network devices A, B, C, D, accompanied by a digital signature σ or short signature σ.

Collect the queues of n−t distinct participating network devices A, B, C, D and store them in a queue vector QV, store the corresponding signatures $\sigma_i$ in a signature vector SV, and propose QV validated by SV for multi-valued Byzantine agreement.

Perform multi-valued Byzantine agreement with validation of the queue vector QV=[$q_j$, ..., $q_n$] by the signature vector SV=[$\sigma_j$, ..., $\sigma_n$] through a determined predicate Q (QV, SV) which is true if and only if for at least n−t distinct indices j, the vector element $\sigma_j$ is a valid signature on a message comprising $q_j$ and $\sigma_j$ by the respective participating network device.

After deciding on a vector of queues DQV, deliver the union of all payload messages in the decided queue vector DQV according to a deterministic order; and proceed to the next round.

In order to ensure liveness of the atomic broadcast protocol, there are at least two ways in which messages can be inserted into the queue: when a participating network device A, B, C, D receives a broadcast activation message and when a participating network device A, B, C, D receives the queue of another participating network device A, B, C, D pertaining to the current round. If either of these two messages arrive and comprise any yet undelivered payload message, and if the participating network device A, B, C, D has not yet sent its own queue of the current round, then it starts the next iteration by inserting the payload in its queue and sending the queue to all participating network devices A, B, C, D. A more detailed description is found below with reference to FIG. 4.

The term n−t in the atomic broadcast protocol above could be replaced by any c between t+1 and n−t if the fairness condition is changed such that n−c+1 participating network devices A, B, C, D have to be activated instead of t+1.

Figure 4:
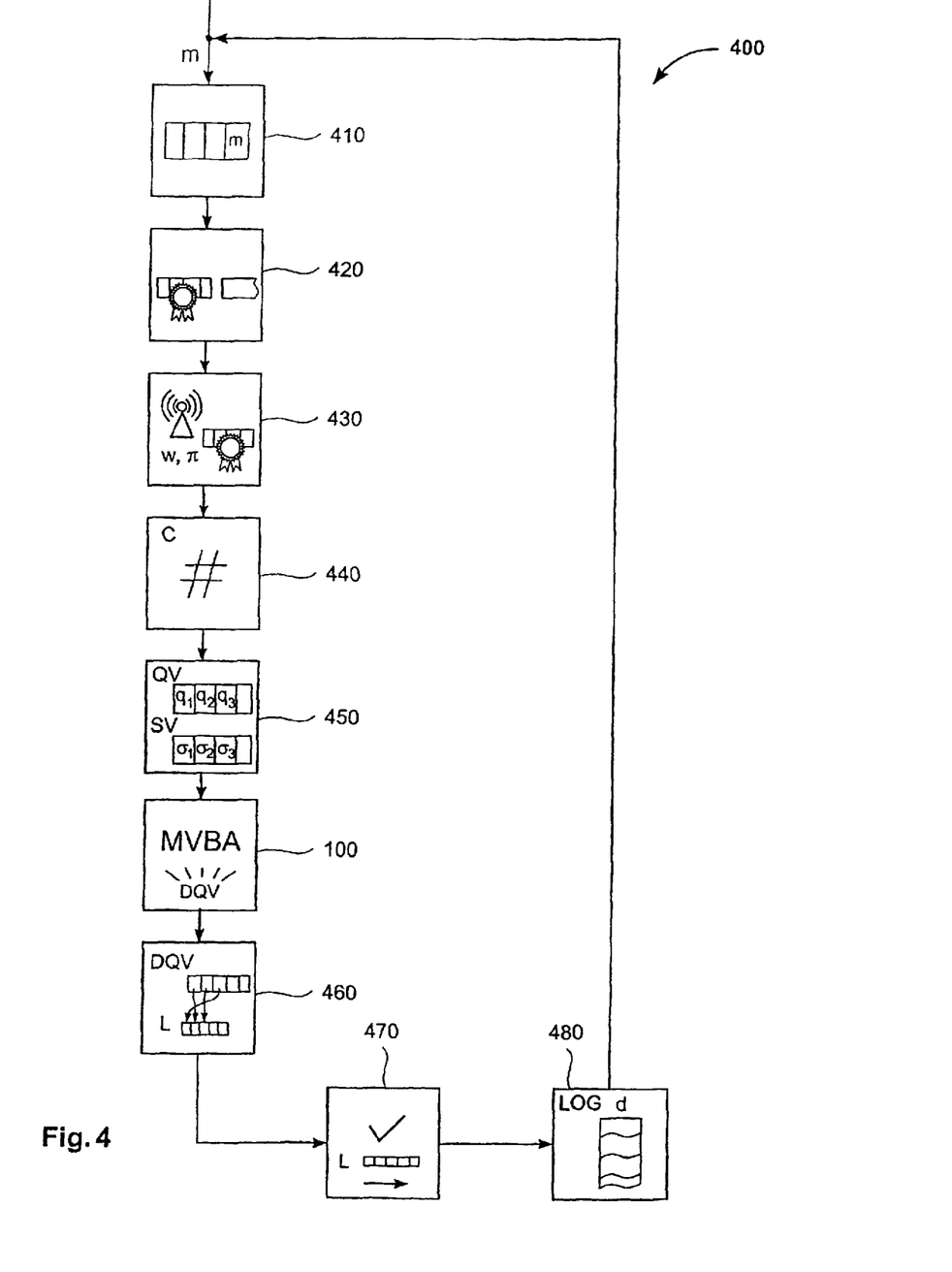
FIG. 4 shows a an example of a schematic illustration of an atomic Broadcast protocol according to the present invention.

FIG. 4 shows the flow of an atomic broadcast protocol 400 for an implementation. This atomic broadcast protocol 400 provides a method for reliably broadcasting messages in an order within the asynchronous network 1 to 5 comprising n participating network devices A, B, C, D. It tolerates a number t of less than n/3 faulty participating network devices. Each participating network device A, B, C, D stores a queue q and a log file, hereafter called log d, as it is known in the art. The method operates in rounds, whereby each round comprises the following steps. Each participating network device A, B, C, D is responsive to a message broadcast request comprising a message value m. If the participating network device A, B, C, D receives such a broadcast request it appends the message value m to the queue q unless the log d or the queue q comprises the message value m already, as indicated with box 410. Then, as indicated with box 420, a signature σ on a defined portion of the queue q is derived. In the next step, as indicated with box 430, a queue message comprising the queue q and the signature σ is broadcast to all participating network devices A, B, C, D. As indicated with box 440, a number c of at least t+1 queue messages comprising c proposed queues $q_1, q_2, q_3$ and proposed signatures $\sigma_1, \sigma_2, \sigma_3$ is then received. The proposed queues $q_1, q_2, q_3$ are stored in the queue vector QV and the proposed signatures $\sigma_1, \sigma_2, \sigma_3$ are stored in the signature vector SV. This is indicated in box 450. Then, as indicated with box 100, the queue vector QV is proposed for a Byzantine agreement which is validated by the signature vector SV. A method for achieving validated agreement on a common value is performed. Such a method can be the method for achieving agreement as described with reference to FIG. 2. This method takes as input a proposed value w, a proposed justification π, and a proposed predetermined predicate Q. The proposed value w is set to the queue vector QV, the proposed justification π is set to the signature vector SV, and the proposed predetermined predicate Q is set to the determined predicate Q. The determined predicate Q asserts that the signature vector SV comprises c valid signature entries of distinct participating network devices A, B, C on entries of the queue vector QV. As indicated with box 460 and in response to the result of the Byzantine agreement an ordered list L of unique message values out of the entries of the decided queue vector DQV is prepared. Then, the unique message values are accepted in the ordered list L in the sequence of the ordered list L, as indicated in box 470, and the accepted unique message values are appended to the log d before the next round can start, as indicated with box 480 and the arrow to the start.

Digital Notary Services

In the following a digital notary service is described which takes advantages of the methods described above. This is an example of the general state machine replication technique, for which atomic broadcast protocols are useful. In general, the simplest state machine is a counter. Despite this simplicity, there are a number of applications in which a counter provided by a central authority is of fundamental importance. A digital notary service is an example of this.

In its most basic form, a digital notary service receives documents from clients, assigns a sequence number to each of them, and certifies this by its signature. The service provides essentially a logical time stamp.

Assumed, the notary service is a single physical location, the documents can simply be given consecutive numbers as they come in the front door and the community at large has simply to trust that what happens inside that building is honest and reliable; something not much different can also be done when the notary service moves to a single server on the Internet. It is, however, wise to distribute such a service among n>3 hosts, servers, or participating network devices running different software under separate system administration and in separate physical locations, in order to remove the single point of failure and to provide a more robust service. A reasonable model to apply for the distributed servers is one of participating network devices A, D, C, D communicating over the asynchronous network 1 to 5, which is presumed to be in the hands of the adversary D, who is also presumed to have corrupted up to t<n/3 of the participating network devices or servers. Several security concerns have to be satisfied if the distributed notary service is to continue to function:

The documents should be processed atomically, i.e., despite asynchronous communication, each application receives a unique sequence number, and all honest participating network devices A, B, C have to agree on the number assigned to a given document.

The resulting sequence numbers should be signed in such a way that the client can be confident that her number is provably legitimate, and not merely the result of deceptive messages from the adversary.

These requirements can be met by using an atomic broadcast protocol for broadcasting the documents in an order. The notary application has to take some additional steps to produce the desired signatures. In particular:

During initialization, a dealer creates keys for an (n, t+1)-threshold signature scheme S and gives them to the participating network devices A, B, C, D, hereafter also referred to as notary servers. Within the initialization phase, each notary server initializes a counter seqnum to zero.

The notary servers wait for the delivery of a message by the atomic broadcast protocol, whose payload m comprises the document to be notarized and the identity of the client.

When such a message is delivered, each notary server increments the counter seqnum, creates an S-signature share σ on the message (m, seqnum), and transmits (seqnum, σ) to the client indicated in the delivered message.

The client uses this service by sending the document m in a message to all notary servers, requesting atomic broadcast delivery of this message among the notary servers, waiting for at least t+1 distinct notary servers to reply with a sequence number and valid S-signature share and then assembling the shares into a S-signature on the message (m, seqnum).

One inelegant aspect of the notary service is that it seems to put some of the onus of dealing with the distributed service on the individual clients, in that the client has send initially a message to all notary servers and to assemble herself the signature shares at the end of the process. This could be avoided, at the cost of an additional round of communication among the notary servers, by having each one broadcast its S-signature share to its peers and then wait for enough such shares to come back from other notary servers so that it could assemble the signature itself. However, in practice, the sending of the client's outgoing message and the assembly of a signature from the incoming server messages would be handled by routines in the communications software library, so these internals would not be the concern of the client application at all.

Other Distributed Services

Several other distributed services with a similar need of a synchronized and signed sequence number can all fall under the rubric of a "digital bidding service". One can imagine a valuable item for which the order of arrival of the bids as well as the details of the bids themselves are used to allocate the good or goods to (some of) the clients. Stocks, where both the order in which the offers are made as well as the offered purchase price, or government contracts, where again the priority of the bid as well its specific terms are used to assign the contract, are both items which would benefit from such a service. In individual applications, the details of the small modifications to the atomic broadcast protocol which would be necessary may vary, such as particular requirements of client authentication or creation of a mechanism to terminate a bidding process, but the general outline would be very similar to the above example.

Hybrid Adversary Structures

Instead of a fixed threshold of t out of n corruptions, it is possible to gain more flexibility by reflecting real world structures.

For example, an adversary could be able to control all participating network devices with a certain operating system, or he might bribe one system administrator to get access to all participating network devices at a specific site. Adversary structures cope with such an attack scheme.

In general, to define an adversary structure T, one has to define every coalition of parties whose corruption the system should tolerate, e.g., a coalition of all participating network devices with the same operating system. The set of all those sets then is the adversary structure T.

In the method for achieving agreement among n participating network devices and the method for reliably broadcasting messages in an order, several types of failures can occur simultaneously. For example, it could differ between crash failures CF, Byzantine failures BF, and link failures LF. This allows for a higher number overall number of failures to be tolerated.

The present invention can be realized in hardware, software, or a combination of hardware and software. A visualization tool according to the present invention can be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

What is claimed is:

1. A method comprising:

achieving agreement among n participating network devices in an asynchronous network for deciding on a common value (v) being validated by a justification (p) together satisfying a predetermined predicate (Q), a agreement arising out of a series of messages being sent and received by each participating network device with up to a number t of faulty devices, each participating network device performing the following steps:

i) broadcasting to the participating network devices an echo message comprising a proposed value (w) and a proposed justification ($\pi$) by using verifiable and consistent broadcast;

ii) receiving n–t echo messages comprising candidate values ($w_1$, $w_2$, $w_3$) and candidate justifications ($\pi_1$, $\pi_2$, $\pi_3$) satisfying the predicate (Q), and repeating the following steps 1) to 3) for each participating network device as a candidate device represented by a candidate device identifier (a) according to an order:

1) broadcasting to all participating network devices a vote message comprising the candidate device identifier (a), and either a first agree-value (Y) together with the candidate value ($w_a$) and the candidate justification ($\pi_a$), or a second agree-value (N), 2) receiving vote messages and counting up to n–t vote messages including the second agree-value (N) or the first agree-value (Y), the candidate value ($w_a$), and the candidate justifications ($\pi_a$) satisfying the predicate (Q), 3) performing a Byzantine agreement to determine whether the candidate device has sent the candidate value ($w_a$) and the candidate justification ($\pi_a$) satisfying the predicate (Q), iii) in response to the result of the Byzantine agreement, deciding the common value (v) proposed as the candidate value (w) and the justification (p) proposed as the candidate justification ($\pi$) of an agreed candidate device.

2. Method according to claim 1, whereby step ii) further comprises broadcasting a commit message comprising sender identities of received echo messages, receiving commit messages, selecting randomly the order of the candidate device by opening at least one cryptographic common coin, and whereby in step 2) the vote messages are counted which are consistent with the received commit messages.

3. Method according to claim 2, whereby the step of opening at least one cryptographic common coin comprises using a distributed coin-tossing protocol.

4. Method according to claim 1, whereby in step i) the verifiable and consistent broadcast comprises a certified delivery of the broadcasted echo message within a sent message and reaching agreement on the content of the broadcasted echo message.

5. Method according to claim 1, whereby in step i) the verifiable and consistent broadcast comprises exchanging signed messages between the participating network devices.

6. Method according to claim 1, whereby in step i) the verifiable and consistent broadcast comprises using threshold signatures.

7. Method according to claim 1, whereby steps 1) and 2) in step ii) comprise broadcasting the candidate value ($w_a$) and the candidate justification ($\pi_a$) upon a request.

8. Method according to claim 1, whereby in step ii) the participating network devices are voting on several candidate devices simultaneously.

9. Method according to claim 1, whereby the number t of faulty devices is extended to a set T of sets comprising participating network devices.

10. Method according to claim 9, whereby the participating network devices show hybrid failures (BF, CF, LF) reflecting a different structure of the set T or different thresholds $t_i$, with i=1, 2, . . . l.

11. An article of manufacture comprising a computer usable medium having computer readable program code means embodied therein for causing achievement of agreement, the computer readable program code means in said article of manufacture comprising computer readable program code means for causing a computer to effect the steps of claim 1.

12. A program storage device readable by machine, tangibly embodying a program of instructions executable by the machine to perform method steps for causing achievement of agreement, said method steps comprising the steps of claim 1.

13. A method for reliably broadcasting messages in an order within an asynchronous network comprising n participating network devices and tolerating a number t of less than n/3 faulty participating network devices, each participating network device storing a queue (q) and a log (d), the method operating in rounds, each round comprising the following steps:

i) responsive to a message broadcast request comprising a message value (m) performing the step of: appending the message value (m) to the queue (q) unless the log (d) or the queue (q) comprises the message value (m), ii) deriving a signature ($\sigma$) on the queue (q), iii) broadcasting to all participating network devices a queue message comprising the queue (q) and the signature ($\sigma$), iv) receiving a number c of at least t+1 queue messages comprising c proposed queues and proposed signatures, v) storing the proposed queues in a queue vector (QV) and the proposed signatures in a signature vector (SV), vi) proposing the queue vector (QV) for Byzantine agreement validated by the signature vector (SV) and performing a method for achieving agreement on a common value being validated by a justification (p) together satisfying a predetermined predicate (Q) by validating the queue vector (QV) and the signature vector (SV) through a determined predicate (Q) asserting that the signature vector (SV) comprises c valid signature entries of distinct participating network devices (A, B, C) on entries of the queue vector (QV), vii) preparing in response to the result of the Byzantine agreement an ordered list (L) of unique message values out of the entries of the decided queue vector (DQV)

viii) accepting the unique message values in the ordered list (L) in the sequence of the ordered list (L), ix) appending the accepted unique message values to the log (d).

14. Method according to claim 13, whereby step of performing a method for achieving agreement on a common value comprises:

achieving agreement among n participating network devices in an asynchronous network for deciding on a common value (v) being validated by a justification (p) together satisfying a predetermined predicate (Q), the agreement arising out of a series of messages being sent and received by each participating network device with up to a number t of faulty devices, each participating network device performing the following steps:

i) broadcasting to the participating network devices an echo message comprising a proposed value (w) and a proposed justification ($\pi$) by using verifiable and consistent broadcast;

ii) receiving n-t echo messages comprising candidate values ($w_1$, $w_2$, $w_3$) and candidate justifications ($\pi_1$, $\pi_2$, $\pi_3$) satisfying the predicate (Q), and repeating the following steps 1) to 3) for each participating network device as a candidate device represented by a candidate device identifier (a) according to an order:

2) broadcasting to all participating network devices a vote message comprising the candidate device identifier (a), and either a first agree-value (Y) together with the candidate value ($w_a$) and the candidate justification ($\pi_a$), or a second agree-value (N), 2) receiving vote messages and counting up to n-t vote messages including the second agree-value (N) or the first agree-value (Y), the candidate value ($w_a$), and the candidate justifications ($\pi_a$) satisfying the predicate (Q), 3) performing a Byzantine agreement to determine whether the candidate device has sent the candidate value ($w_a$) and the candidate justification ($\pi_a$) satisfying the predicate (Q), iii) in response to the result of the Byzantine agreement, deciding a common value (v) proposed as the candidate value (w) and the justification (p) proposed as the candidate justification ($\pi$) of an agreed candidate device.

15. Method according to claim 13, whereby step iv) further comprises appending an unknown message value found in a received queue message to the queue (q) unless the log (d) or the queue (q) comprises the unknown message value.

16. Method according to claim 13, whereby the number t of faulty devices is extended to a set T of sets comprising participating network devices.

17. Method according to claim 16, whereby the participating network devices show hybrid failures (BF, CF, LF) reflecting a different structure of the set T or different thresholds $t_i$, with i=1, 2, . . . l.

18. An article of manufacture comprising a computer usable medium having computer readable program code means embodied therein for causing reliable broadcasting of messages, the computer readable program code means in said article of manufacture comprising computer readable program code means for causing a computer to effect the steps of claim 13.

19. A program storage device readable by machine, tangibly embodying a program of instructions executable by the machine to perform method steps for causing reliable broadcasting of messages, said method steps comprising the steps of claim 13.

20. A system comprising:

means for achieving agreement among n participating network devices in an asynchronous network for deciding on a common value (v) being validated by a justification (p) together satisfying a predetermined predicate (Q), the agreement arising out of a series of messages being sent and received by each participating network device with up to a number t of faulty devices, each participating network device including:

i) means for broadcasting to the participating network devices an echo message comprising a proposed value (w) and a proposed justification ($\pi$) by using verifiable and consistent broadcast;

ii) means for receiving n-t echo messages comprising candidate values ($w_1$, $w_2$, $w_3$) and candidate justifications ($\pi_1, \pi_2, \pi_3$) satisfying the predicate (Q), and repeating the following steps 1) to 3) for each participating network device as a candidate device represented by a candidate device identifier (a) according to an order:

3) means for broadcasting to all participating network devices a vote message comprising the candidate device identifier (a), and either a first agree-value (Y) together with the candidate value ($w_a$) and the candidate justification ($\pi_a$), or a second agree-value (N), 2) means for receiving vote messages and counting up to n–t vote messages including the second agree-value (N) or the first agree-value (Y), the candidate value ($w_a$), and the candidate justifications ($\pi_a$) satisfying the predicate (Q), 3) means for performing a Byzantine agreement to determine whether the candidate device has sent the candidate value ($w_a$) and the candidate justification ($\pi_a$) satisfying the predicate (Q), iii) means for deciding in response to the result of the Byzantine agreement, the common value (v) proposed as the candidate value (w) and the justification (p) proposed as the candidate justification ($\pi$) of an agreed candidate device.

21. A computer program product comprising a computer usable medium having computer readable program code means embodied therein for causing achievement of agreement, the computer readable program code means in said computer program product comprising computer readable program code means for causing a computer to effect the functions of claim 20.

* * * * *